Sept. 8, 1942.                R. F. WINDERS                2,295,278
                                TIE ELEMENT
                            Filed April 5, 1940
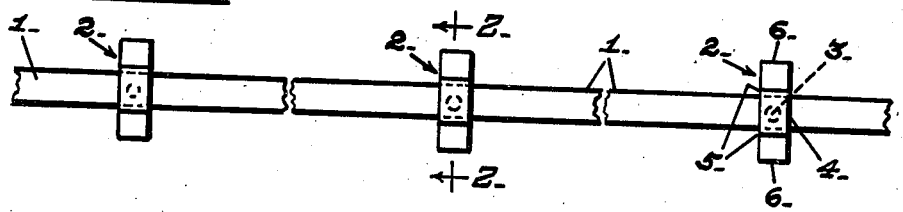
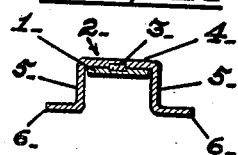 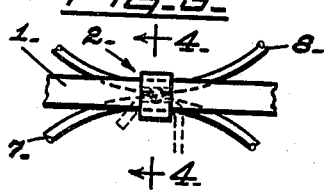 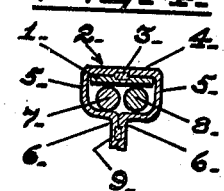
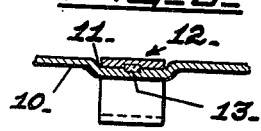  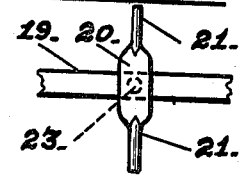
 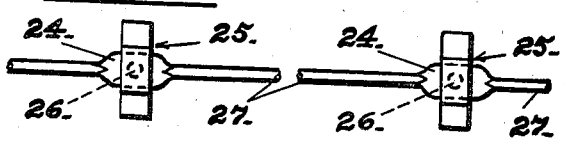
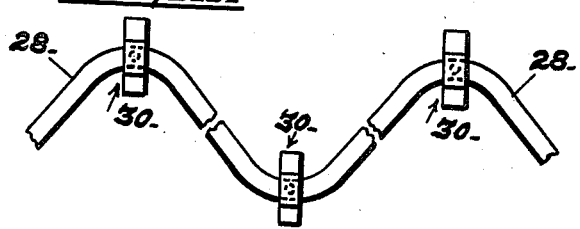 
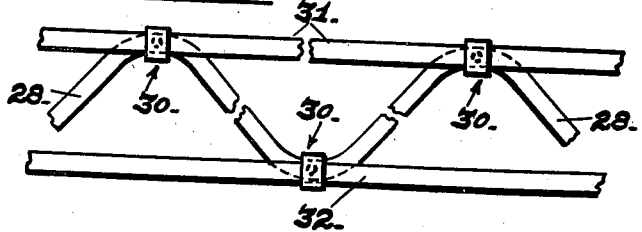 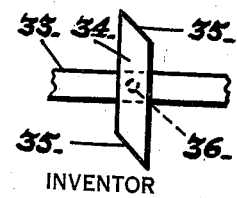
INVENTOR
Robert Frank Winders Patented Sept. 8, 1942

2,295,278

UNITED STATES PATENT OFFICE 2,295,278

TIE ELEMENT

Robert Frank Winders, Huntington Park, Calif.

Application April 5, 1940, Serial No. 328,048

1 Claim. (Cl. 5—267)

This invention has for its primary purpose the provision of a new article of manufacture in the form of a novel tie element which is similar to round wire in respect to its various tying uses but superior thereto in that, firstly, it is made by cold rolling round wire so that it is either flattened throughout its length or at spaced intervals and will have negative or reduced flexibility and resiliency in one direction and substantially greater resiliency and flexibility than round wire in another direction, and secondly, includes bendable clips fixed on flat surfaces thereof to afford a fixed joining or uniting of separate parts or elements to form a unit structure, as for example, an inner spring assembly having desired rigidity, strength and flexibility.

Another purpose of the present invention is the provision of a new method of making the novel tie element hereof which includes the step of annealing the element to compensate for the objectionable hardening effects caused by welding the clips, and thereby restore uniformity of the original qualities of temper and strength throughout the element.

A further purpose of the invention is to provide a flat tie element of the character described which unlike a round wire tie of small diameter, makes possible an effective welding of the attaching clips thereto and thereby prevents slippage and twisting of the clips relative to the flat element whereby to better hold unit parts in fixed relationship and eliminate looseness in the assembled structure.

Yet another purpose is to provide a flat tie element of the character described which may be straight or formed sinuously or otherwise deformed in a direction parallel to the planes of its flat surfaces or in other words, transversely of said element, and in all event is capable of being made up in long "flat" sections or rolled like wire and cut off in lengths as desired.

With the above and other objects in view the invention consists in the novel construction and combination of parts hereinafter described, illustrated in the accompanying drawing, and set forth in the claims hereto appended, it being understood that various changes in form, proportion, size and minor details of construction within the scope of the claim may be resorted to without departing from the spirit or sacrificing any of the advantages of the invention.

In the drawing:

Figure 1 is a top plan view of a tie element embodying my invention.

Figure 2 is an enlarged cross section on the line 2—2 of Figure 1.

Figure 3 is a fragmentary top plan view showing the element hereof as when joining two unit parts such as springs of an inner spring structure.

Figure 4 is an enlarged cross sectional view on the line 4—4 of Figure 3.

Figure 5 is a fragmentary longitudinal sectional view of a modified form of tie element.

Figure 6 is an enlarged cross section view of another modified form of the invention.

Figure 7 is a fragmentary top plan view of another form of the invention.

Figure 8 is an enlarged cross section view showing the clip member of Figure 7 as twisted to embrace the members to be secured thereby.

Figure 9 is a fragmentary top plan view of another modified form of the invention.

Figure 10 is a fragmentary top plan view of another form of my invention.

Figure 11 is a fragmentary plan view of the pre-formed blank of round wire before being flattened to produce the form shown in Figure 10.

Figure 12 is a fragmentary plan view of the modified form of Figure 10 as when joining parallel unit members.

Figure 13 is a fragmentary top plan view of another modified form.

In carrying out my invention to produce the embodiment thereof as shown in Figures 1 to 4 inclusive a continuous length of round, spring wire is cold rolled to form a flat or ribbon like body or strip 1 of my tie element, which body in the present instance is rectangular in cross section. Whether developed in straight lengths or sinuously or otherwise formed the flat body or strip 1 is substantially inflexible in directions parallel to planes of its flat surfaces, or in other words has negative resiliency in this direction but in directions parallel to planes perpendicular to said surfaces is freely flexible and has greater resiliency than the round wire of which it is made. Thus the flat body or strip 1 affords a certain rigidity beyond that of round wire and at the same time is flexible in such manner that it is well suited to joining in fixed relation a plurality of separate parts or elements to form a unitary structure, such as a bed spring or an analogous structure.

It should be noted that a small round wire element used as a tie does not afford sufficient plane surface to effectively weld thereto attaching clips or elements, since in making the welds the entire cross section will become objectionably hardened and weak.

With the flat cross section afforded by the strip 1, hereof, bendable metal clips 2 or similar attaching devices may be spot welded thereto as at 3 and the spot affected will comprise but a relatively small part of the area or cross section of the strip. Where spring steel wire having a relatively high carbon content is used, this spot welding will objectionably harden the structure at and adjacent the spot and although these hardened and obviously weakened spots are but small portions of the body strip, I find it desirable to subject the entire element to a suitable annealing treatment for the purpose of restoring the entire structure to its original uniform temper and resiliency. I therefore carry out this restoration step as a part of the method of making one embodiment of my invention.

As shown in Figures 1 to 4 inclusive the clips 2 are flat and each comprises a body portion 4 lying across the flat strip 1 and provided with right angularly extended legs 5 having outturned ends 6, said legs engaging the edges of the strip. Preferably, the clips are preformed as above noted and then spot welded to the strip at desired spaced points thereon.

As shown in Figure 3 I may use the tie element of my invention for joining in fixed relation the members 7 and 8 such for example as the springs of an inner spring structure. In this instance said members or springs lie against the flat under face of the strip 1 and as seen in Figure 4 the clip is bent so that the ends 6 abut centrally beneath the strip and the members 7 and 8 encompassed by the legs 5. These legs are bent to lie in part parallel to the strip and hold the members 7 and 8 against the latter. The abutting ends 6 are spot welded as at 9. With this arrangement it is seen that a strong "box" joint is provided between the members 7 and 8 and the strip 1 and that the members 7 and 8 are held in the desired fixed relation to one another and the strip. Due to the negative flexibility of the strip transversely thereof and also to the fact that the clips 2 are welded and cannot slip longitudinally on the strip the members 7 and 8 are held in laterally braced and in longitudinally spaced and fixed relation. However, the tie element as a whole is free to flex and is highly resilient in a direction perpendicular to its width and this is highly essential in coiled spring and analogous structures.

It should be noted that the clips 2 may be made of softer steel than the body or strip 1 whereby they may be readily bent into desired clamping engagement with the members 7 and 8 or other separate parts which are to be joined thereby.

In Figure 5 is shown a modified form of my tie element, comprising a flat body strip 10 identical to the strip 1 except that it is transversally upset as at 11 for countersinking the clips 12. These clips are the same as the ones 2 and are spot welded to the strip as at 13.

In Figure 6 another modified form of my invention consists of a flat body strip 14 identical with the strip 1, and a flat bendable clip 15 spot welded thereto in the same manner as in the other forms of the invention but adapted to fold around the separate members 16 and 17 which are to be united. The ends of this clip are overlapped and spot welded as at 18.

In Figures 7 and 8 another modified form comprises a flat strip 19 identical with strip 1 and a modified form of clip having a flat strip engaging portion 20. The remainder of this clip is round or wire-like in cross section to form end members 21, which may be twisted together around members 22 to be tied, as shown in Figure 8. The flat portion 20 is spot welded as at 23 to the strip.

In Figure 9 I have shown another form of my invention wherein the round wire of which the body of the tie element is formed, is cold rolled to form spaced flat portions 24 at the points where the clips 25 are to be spot welded thereto as at 26. This provides spaced lengths 27 of round wire throughout the length of the tie element, the clips being in this case the same as shown in Figures 1 to 4 inclusive but obviously any of the several forms could be used with this type of body strip.

As shown in Figure 10, another form of my invention consists of a sinuous flat body 28 which is formed by cold rolling a round wire 29 of smaller sinuous form as shown in Figure 11, said round wire expanding and lengthening to the extent substantially as shown in Figure 10, when rolled flat. In this form, clips 30 are welded to each bend, said clips are the same as shown in Figures 1 to 4.

As shown in Figure 12, among other uses the tie element of Figure 10 may be employed to join flat parallel unit members 31 and 32 which will lie against the upper sides of bends of the strip 28.

The modified form of the invention shown in Figure 13 includes a flat resilient strip 33 the same as strip 1, but provided with flat clips such as the one 34, having diagonally formed ends 35. These clips are spot welded as at 36 and the diagonal ends abutted to form a smooth diagonal seam joint when the clips are bent around separate members for forming a unit structure as hereinbefore described.

The annealing treatment may be applied to any of the several forms of the invention for the same purpose as described in connection with the form shown in Figures 1 to 4 inclusive. Likewise any one or all of the several forms of clips may be of softer metal than the flat body portion with which it is used for the purpose hereinbefore described.

It is now apparent that the tie elements of my invention constitute a new article of manufacture which may be put up and sold in lots like wire or similar tie material.

I claim:

A tie element comprising a continuous flat spring metal strip of substantially rectangular cross-section having negative resiliency and flexibility in a direction parallel to the planes of its flat surfaces and being flexible and resilient in a direction at right angles to said planes, and attaching clips each having a flat portion between its ends fixed to said strip, intermediate bendable portions extending at right angles to and from the ends of said flat portion at edges of said strip and adapted to be bent toward each other, and end portions which extend outwardly from said intermediate portions and are adapted to be brought into face to face contact and welded together when the intermediate portions are bent inwardly for encompassing and affixing in contact with the strip separate elements for forming a unitary structure analogous to a bed spring or inner spring assemblies.

ROBERT FRANK WINDERS.